(12) United States Patent
Kovalev et al.

(10) Patent No.: US 11,041,075 B2
(45) Date of Patent: *Jun. 22, 2021

(54) SELF-HEALING COMPOSITION, SELF-HEALING FILM, AND DEVICE INCLUDING THE SELF-HEALING FILM

(71) Applicant: SAMSUNG ELECTRONICS CO., LTD., Suwon-si (KR)

(72) Inventors: Mikhail Kovalev, Suwon-si (KR); Chung Kun Cho, Suwon-si (KR); Myung Man Kim, Suwon-si (KR); Nobuji Sakai, Kanagawa-ken (JP)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/521,008

(22) Filed: Jul. 24, 2019

(65) Prior Publication Data

US 2019/0345340 A1    Nov. 14, 2019

Related U.S. Application Data

(63) Continuation of application No. 15/784,603, filed on Oct. 16, 2017, now Pat. No. 10,407,574.

(30) Foreign Application Priority Data

Oct. 20, 2016    (KR) .................. 10-2016-0136690

(51) Int. Cl.
| | |
|---|---|
| *C09D 4/00* | (2006.01) |
| *C08F 230/08* | (2006.01) |
| *C08F 290/06* | (2006.01) |
| *C08G 18/48* | (2006.01) |
| *C08G 18/66* | (2006.01) |
| *C08G 18/67* | (2006.01) |
| *C09D 175/16* | (2006.01) |
| *C08G 18/12* | (2006.01) |
| *C08G 18/32* | (2006.01) |
| *C08G 18/34* | (2006.01) |
| *C08G 18/42* | (2006.01) |
| *C08G 18/75* | (2006.01) |
| *C09D 135/02* | (2006.01) |
| *C08K 5/549* | (2006.01) |

(52) U.S. Cl.
CPC .............. *C09D 4/00* (2013.01); *C08F 230/08* (2013.01); *C08F 290/067* (2013.01); *C08G 18/12* (2013.01); *C08G 18/3206* (2013.01); *C08G 18/34* (2013.01); *C08G 18/4277* (2013.01); *C08G 18/4825* (2013.01); *C08G 18/664* (2013.01); *C08G 18/6659* (2013.01); *C08G 18/6674* (2013.01); *C08G 18/672* (2013.01); *C08G 18/755* (2013.01); *C09D 135/02* (2013.01); *C09D 175/16* (2013.01); *C08K 5/549* (2013.01)

(58) Field of Classification Search
None
See application file for complete search history.

(56) References Cited

U.S. PATENT DOCUMENTS

| | | | |
|---|---|---|---|
| 4,889,901 A | 12/1989 | Shama | C09D 4/00 526/279 |
| 5,322,861 A | 6/1994 | Tsuge | C08G 18/10 522/174 |
| 7,091,297 B2 | 8/2006 | Mather | A61F 2/88 524/404 |
| 8,163,357 B2 | 4/2012 | Engardio | G02B 1/105 426/446 |
| 8,975,308 B2 | 3/2015 | Kim et al. | |
| 8,980,432 B2 | 3/2015 | Sonoda et al. | |
| 9,349,778 B2 | 5/2016 | Kim et al. | |
| 2005/0009945 A1 | 1/2005 | Wenning | C09D 5/03 522/148 |
| 2009/0253842 A1 | 10/2009 | Mather | C08G 18/3893 524/404 |
| 2011/0184125 A1 | 7/2011 | Zhao | 525/131 |
| 2011/0256322 A1 | 10/2011 | Outlaw | C09D 4/06 427/503 |
| 2013/0261209 A1 | 10/2013 | Kim | C08G 18/672 522/33 |
| 2014/0128495 A1 | 5/2014 | Wang et al. | |

FOREIGN PATENT DOCUMENTS

| | | |
|---|---|---|
| CN | 105038566 A | 11/2015 |
| EP | 2644668 B1 | 12/2015 |
| JP | 2004083626 A | 3/2004 |
| KR | 1020110102753 A | 9/2011 |
| KR | 1020120093088 A | 8/2012 |

(Continued)

OTHER PUBLICATIONS

Gao et al. "Synthesis and Curing Kinetics of UV-Curable Waterborne Bisphenol-S Epoxy-Acrylate/Polyurethane-Acrylate/Methacryloylpropyl-POSS Nanocomposites" Journal of Macromolecular Science, Part B: Physics, 53, 2014, 1800-1813. (Year: 2014).*

(Continued)

*Primary Examiner* — Robert S Loewe

(74) *Attorney, Agent, or Firm* — Cantor Colburn LLP

(57) ABSTRACT

A self-healing composition including, urethane (meth)acrylate having two (meth)acrylate groups, six or more urethane groups, and a substituted or unsubstituted polyhedral silsesquioxane.

22 Claims, 8 Drawing Sheets

(4 of 8 Drawing Sheet(s) Filed in Color)

(56) References Cited

FOREIGN PATENT DOCUMENTS

| WO | 9005752 A1 | 5/1990 |
|---|---|---|
| WO | 2015033183 A1 | 3/2015 |
| WO | 2015133517 A1 | 9/2015 |
| WO | 2015198493 A1 | 12/2015 |
| WO | 2016046135 A1 | 3/2016 |

OTHER PUBLICATIONS

Extended European Search Report dated Mar. 6, 2018, of corresponding European European Patent Application No. 17193841.8.
Gao et al. "UV-Curable Coating of Epoxy Acrylate/Polyurethane-Acrylate Nanocomposites Modified with V-POSS" Advanced Materials Research vols. 217-218, 2011, 559-563. (Year: 2011).
Kim et al. "Polyhedral oligomeric silsesquioxane-reinforced polyurethane acrylate" Progress in Organic Coatings 2009, 64, 205-209. (Year: 2009).
Wang et al. "UV-curable waterborne polyurethane acrylate modified with octavinyl POSS for weatherable coating applications" J. Polym. Res. 2011, 18, 721-729. (Year: 2011).
Cheng et al. "Synthesis and properties of silsesquioxane-based hybrid urethane acrylate applied to UV-curable flame-retardant coatings" Progress in Organic Coatings, 65, 2009, 1-9. (Year: 2009).
Office Action dated Dec. 15, 2020, of the corresponding Chinese Patent Application No. 201710976335.0.

\* cited by examiner

SELF-HEALING COMPOSITION, SELF-HEALING FILM, AND DEVICE INCLUDING THE SELF-HEALING FILM

CROSS-REFERENCE TO RELATED APPLICATION

This application is a continuation application of U.S. patent application Ser. No. 15/784,603, filed on Oct. 16, 2017, which claims priority to and the benefit of Korean Patent Application No. 10-2016-0136690, filed in the Korean Intellectual Property Office on Oct. 20, 2016, the entire contents of which in their entirety are incorporated herein by reference.

BACKGROUND

1. Field

A self-healing composition, a self-healing film, and a device including the same are disclosed.

2. Description of the Related Art

A thin and light display material and use of such as a portable electronic device such as a smart phone or a tablet PC are increasingly in demand. A tempered glass having satisfactory mechanical characteristics may be applied on the front screen of the portable electronic device to protect the portable electronic device from damage. However, the tempered glass is heavy and easily broken by an external impact and thus has a limit in application to the portable electronic device. As an alternative to tempered glass, a hard coating layer may be applied to the front screen of a portable electronic device. However, the hard coating layer is easily scratched by an external impact, and it is difficult to recover the hard coating layer to its original state after it has been scratched by the external stress. In addition, the flexibility of the hard coating layer is too low to be applied for a flexible, foldable device.

It is thus desirable to provide a protective material having improved properties which can be applied to an electronic device, in particular, a foldable electronic device.

SUMMARY

A self-healing composition is provided. The self-healing composition has excellent self-healing characteristics, which enable recovery from a scratched state to the original state. The self-healing composition also has excellent flexibility allowing for application to a foldable device, or the like, as well as excellent transparency and hardness. A self-healing film including the cured product of the self-healing composition and a device including the film are also provided.

In an embodiment, a self-healing composition includes urethane (meth)acrylate having two (meth)acrylate groups, six or more urethane groups, and a substituted or unsubstituted polyhedral silsesquioxane.

The urethane (meth)acrylate may be a reaction product of a C1 to C20 aliphatic diisocyanate, a C1 to C100 aliphatic diol, and a C1 to C20 hydroxyalkyl(meth)acrylate.

The C1 to C100 aliphatic dial may include about 50 weight percent (wt %) to about 99 wt % of a C10 to C100 polyalkylene glycol or polylactone glycol and about 1 wt % to about 50 wt % of a C1 to C9 alkylene glycol.

The urethane (meth)acrylate may be represented by Chemical Formula 1.

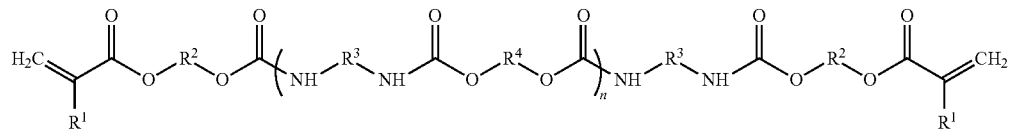

Chemical Formula 1

In Chemical Formula 1, n is a number ranging from 2 to 30, $R^1$ is a hydrogen atom or a methyl group, $R^2$ and $R^3$ are each independently, a substituted or unsubstituted C1 to C20 alkylene group, or a substituted or unsubstituted C3 to C20 cycloalkylene group, and $R^4$ is a substituted or unsubstituted C1 to C10 alkylene, a C2 to C100 divalent functional group including an ether group, an ester group, or a combination of the ether group and the ester group, or a combination thereof.

In Chemical Formula 1, the —O—$R^4$—O— moiety may be represented by Chemical Formula 4-1 to Chemical Formula 4-4, or a combination thereof.

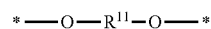

Chemical Formula 4-1

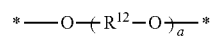

Chemical Formula 4-2

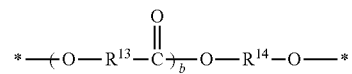

Chemical Formula 4-3

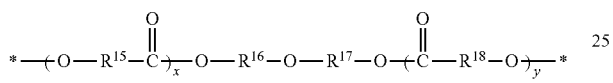

Chemical Formula 4-4

In Chemical Formula 4-1 to Chemical Formula 4-4, $R^{11}$ to $R^{18}$ are each independently a substituted or unsubstituted C1 to C10 alkylene group, and in Chemical Formula 4-2 to Chemical Formula 4-4, a, b, x, and y are each independently a number ranging from 2 to 100.

In Chemical Formula 1, the —O—$R^4$—O— moiety may be, for example represented by Chemical Formula 4-11 to Chemical Formula 4-17, or a to combination thereof.

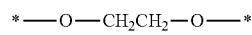

Chemical Formula 4-11

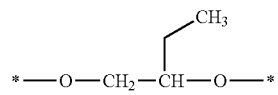

Chemical Formula 4-13

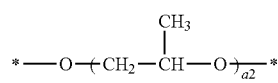

Chemical Formula 4-15

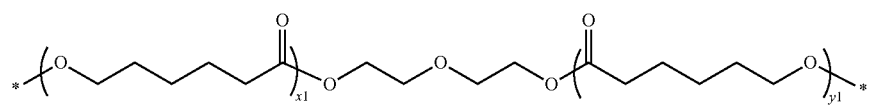

Chemical Formula 4-17

In Chemical Formula 4-14 to Chemical Formula 4-17, a1, a2, a3, x1, and y1 are each independently a number ranging from 2 to 100.

In Chemical Formula 1, $R^3$ may be represented by Chemical Formula 3-1 to Chemical Formula 3-6, or a combination thereof.

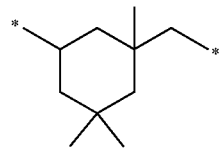

Chemical Formula 3-1

Chemical Formula 3-2

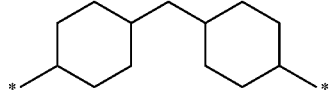

Chemical Formula 3-3

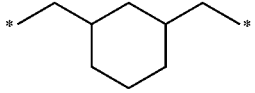

Chemical Formula 3-4

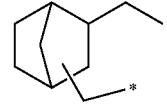

Chemical Formula 3-5

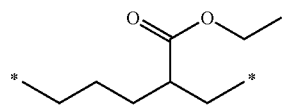

Chemical Formula 3-6

In Chemical Formula 1, $R^2$ may be a substituted or unsubstituted C2 to C6 alkylene group.

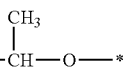

Chemical Formula 4-12

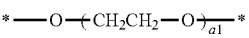

Chemical Formula 4-14

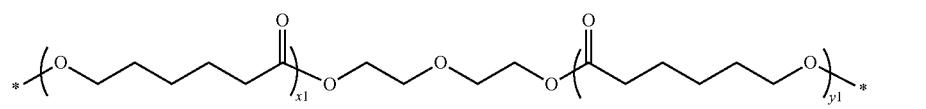

Chemical Formula 4-16

A weight average molecular weight of the urethane (meth) acrylate may range from about 3,000 grams per mole (g/mol) to about 100,000 g/mol.

A glass transition temperature of the urethane (meth) acrylate may range from about −40° C. to about 40° C.

The polyhedral silsesquioxane may be polyhedral silsesquioxane substituted with an alkyl group, an aryl group, a (meth)acryl group, a vinyl group, an amino group, an alcohol group, a carboxyl group, a halogen group, or a combination thereof.

The polyhedral silsesquioxane may be polyhedral silsesquioxane substituted with a phenyl group.

The composition may further include a hardener and a solvent.

The polyhedral silsesquioxane may be present in an amount of about 0.1 wt % to about 20 wt % based on a total solid content of the self-healing composition.

The hardener may be present in an amount of about 0.01 wt % to about 5 wt % based on a total solid content of the self-healing composition.

In an embodiment, a self-healing film includes a cured product of a self-healing composition, the self-healing composition including a urethane (meth)acrylate having two (meth)acrylate groups, six or more urethane groups, and a substituted or unsubstituted polyhedral silsesquioxane.

A scratch in the self-healing film formed by a pencil having a hardness of 4H at a load of 1 kilogram-force may be self-healed in 20 minutes.

Light transmittance of the self-healing film may be greater than or equal to about 90% and a yellowness index of the self-healing film with a self-healing property may be less than or equal to about 1.

In an embodiment, a device including the self-healing film is provided.

The device may be a foldable display.

The self-healing composition according to an embodiment and a self-healing film including the cured product of the self-healing composition, have excellent self-healing characteristics which facilitate recovery from the scratched state to the original state, and also have sufficient flexibility to be applied to a foldable device, as well as excellent hardness and transparency.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, advantages and features of this disclosure will become more apparent by describing in further detail exemplary embodiments thereof with reference to the accompanying drawings, in which.

DETAILED DESCRIPTION

Figure 1A:
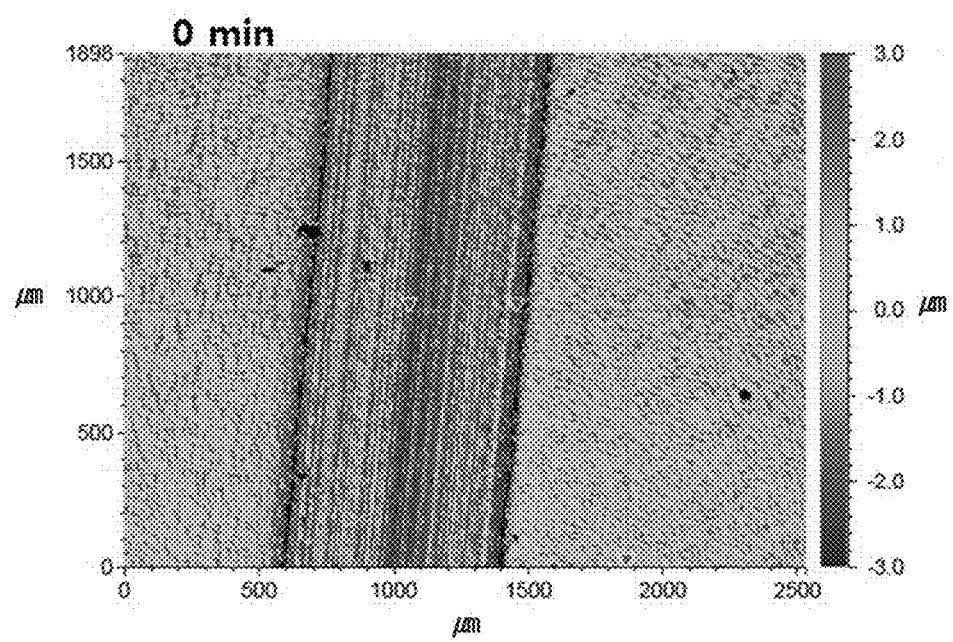
FIG. 1A is a photograph of a surface of a self-healing film in accordance with Example 1-2 as viewed through a 3D microscope immediately after being scratched by a 1 kgf load by a pencil having a hardness of 4H.

Exemplary embodiments will hereinafter be described in detail, and may be easily realized by those who have common knowledge in the related art. However, this disclosure may be embodied in many different forms and is not to be construed as limited to the example embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±20%, 10%, or 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, unless otherwise indicated "substituted" means that the compound or group is substituted with at least one (e.g., 1, 2, 3, or 4) a substituent selected from a C1 to C30 alkyl group, a C2 to C30 alkenyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (F, Cl, Br, or I), a hydroxy group (—OH), a nitro group (—NO$_2$), a cyano group (—CN), an amino group (—NRR' wherein R and R' are independently hydrogen or C1 to C6 alkyl group), a sulfobetaine group (—RR'N$^+$(CH$_2$)$_n$SO$_3^-$, wherein R and R' are independently a C1 to C20 alkyl group), a carboxyl betaine group (—RR'N$^+$(CH$_2$)$_n$COO$^-$, wherein R and R' are independently a C1 to C20 alkyl group), an azido group (—N$_3$), an amidino group (—C(=NH)NH$_2$), a hydrazino group (—NHNH$_2$), a hydrazono group (=N(NH$_2$)), an aldehyde group (—C(=O)H), a carbamoyl group (—C(O)NH$_2$), a thiol group (—SH), an ester group (—C(=O)OR, wherein R is a C1 to C6 alkyl group or a C6 to C12 aryl group), a carboxyl group (—COOH) or a salt thereof (—C(=O)OM, wherein M is an organic or inorganic cation), a sulfonic acid group (—SO$_3$H) or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), instead of hydrogen, provided that the substituted atom's normal valence is not exceeded.

The prefix "hetero" refers to a compound or group which includes at least heteroatom (e.g., one including 1 to 3 hetero atoms), wherein the heteroatom is each independently N, O, S, Si, or P.

"Combination thereof" refers to a combination of at least two components, wherein the combination is in the form of a mixture, a stacked structure, a composite, a copolymer, an alloy, a blend, or a reaction product of components.

In a chemical formula, the mark "*" refers to a point of attachment to an atom or a Chemical Formula that may be the same or different.

The term "(meth)acrylate refers to methacrylate and/or acrylate.

"Alkyl" as used herein means a straight or branched chain saturated aliphatic hydrocarbon group having the specified number of carbon atoms, specifically 1 to 12 carbon atoms, more specifically 1 to 6 carbon atoms. Alkyl groups include, for example, groups having from 1 to 50 carbon atoms (C1 to C50 alkyl).

"Aryl," means a cyclic moiety in which all ring members are carbon and at least one ring is aromatic, the moiety having the specified number of carbon atoms, specifically 6 to 24 carbon atoms, more specifically 6 to 12 carbon atoms. More than one ring may be present, and any additional rings may be independently aromatic, saturated or partially unsaturated, and may be fused, pendant, spirocyclic or a combination thereof.

"Vinyl" group includes any group having terminal unsaturation (—CH$_2$=CH$_2$), including acrylate groups (—OC(O)CH=CH$_2$) and methacrylate groups (—OC(O)(CH$_3$)=CH$_2$).

"Amino" has the general formula —N(R)$_2$, wherein each R is independently hydrogen, a C1 to C6 alkyl, or a C6 to C12 aryl, "Alcohol" has a general formula ROH, wherein R is an alkyl group, or an aryl group. The alcohol may be a primary alcohol, a secondary alcohol, or a tertiary alcohol. "Primary alcohol" means an alcohol having the formula RCH$_2$OH, wherein R is an alkyl group, or an aryl group. "Secondary alcohol" means an alcohol having the formula RR'CHOH, wherein R and R' are each independently an alkyl group, an aryl group, or the like. "Tertiary alcohol" means an alcohol having the formula RR'R"COH, wherein R, R', and R" are each independently an alkyl group, an aryl group, or the like.

"Alkylene" means a straight, branched or cyclic divalent aliphatic hydrocarbon group, and may have from 1 to about 18 carbon atoms, more specifically 2 to about 12 carbons. Exemplary alkylene groups include methylene (—CH$_2$—), ethylene (—CH$_2$CH$_2$—), propylene (—(CH$_2$)$_3$—), cyclohexylene (—C$_6$H$_{10}$—), methylenedioxy (—O—CH$_2$—O—), or ethylenedioxy (—O—(CH$_2$)$_2$—O—).

"Cycloalkylene" means a divalent radical formed by the removal of two hydrogen atoms from one or more rings of a cycloalkyl group (a nonaromatic hydrocarbon that comprises at least one ring).

As used herein, the term "ester group" refers to a group of the formula —O(C=O)R$^x$ or a group of the formula —(C=O)OR$^x$ wherein R$^x$ is C1 to C28 aromatic organic group or aliphatic organic group. An ester group includes a C2 to C30 ester group, and specifically a C2 to C18 ester group.

"Halogen" means one of the elements of Group 17 of the periodic table (e.g., fluorine, chlorine, bromine, iodine, and astatine).

As used herein, the term "self-healing" refers to the ability of a material to heal (e.g., repair) relatively minor damage (e.g., scratches, nicks, cuts, and the like) present in the material.

In an embodiment, a self-healing composition includes urethane (meth)acrylate having two (meth)acrylate groups, six or more urethane groups, and a substituted or unsubstituted polyhedral silsesquioxane. The self-healing composition may be a type of self-healing coating agent, and may be applied to a surface of a device in a form of a film.

The self-healing composition may be an ultraviolet (UV)-curable composition. In this case, the self-healing composition is coated on a surface of a device and cured by ultraviolet (UV) light to provide a film, and the obtained film may be a protective film which is transparent and flexible and has self-healing characteristics. The ultraviolet (UV)-curable self-healing composition according to an embodiment has superior self-healing characteristics as compared to a thermal curable composition, and enhances a processing speed, and suppresses yellowing of the cured product.

The urethane (meth)acrylate has a structure having a (meth)acrylate groups (CH$_2$=CHC(=O)O—, or CH$_2$=C(CH$_3$)C(=O)O—) at each of the terminal ends of the structure. The (meth)acrylate group at the terminal end is a cross-linkable functional group, and may function as a chemical crosslinking site. Since the urethane (meth)acrylate has two (meth)acrylate groups, the degree of cross-linking may be appropriately controlled, and thus a film or a coating layer including a cured product of a self-healing composition according to an embodiment may have desired flexibility, elasticity, and hardness, and may possess foldable, bendable, or rollable characteristics making it is suitable for use for a flexible device. A urethane (meth)acrylate compound including more than two (meth)acrylate cross-linkable functional groups, for example, greater than or equal to about 3, or greater than or equal to about four, has a high cross-linking degree and a relatively low flexibility, so has a limit in being applied for a foldable device or the like.

The urethane (meth)acrylate has a 3 or more diisocyanate-derived units and 2 or more diol-derived units, so as to provide a final structure having 6 or more urethane groups (—NHC(=O)O—) between the terminal chemical cross-linking sites. The urethane (meth)acrylate may also have at least one physical cross-linking site between the chemical crosslinking sites, i.e., between the (meth)acrylate groups. The physical cross-linking site is a moiety capable of providing a hydrogen bond and is broken prior to the chemical crosslinking site when the material is stressed and then recovers itself, and may also refer to a moiety capable of being self-healed when scratched. According to one embodiment, urethane (meth)acrylate having six urethane groups shows self-healing characteristics within a short period time at a room temperature upon being scratched, and may be self-healed even when the urethane (meth)acrylate is scratched with a pencil having a hardness of greater than or equal to 2H.

On the other hand, a urethane(meth)acrylate compound having less than 6 urethane groups between the chemical crosslinking sites, for example, general urethane (meth)acrylate compounds having four urethane groups which have a structure derived from two diisocyanate-derived units and one diol-derived unit, rarely shows self-healing characteristics when scratched, or only demonstrate a relatively low recovered scratch strength. The urethane (meth)acrylate according to an embodiment may have a structure further including at least one diisocyanate-derived unit between two diisocyanate-derived units.

The urethane (meth)acrylate may include greater than or equal to about 6 urethane groups, or greater than or equal to about 8 urethane groups, or greater than or equal to about 10 urethane groups, and less than or equal to about 100 urethane groups, or less than or equal to about 60 urethane groups, or less than or equal to about 40 urethane groups, or less than or equal to about 20 urethane groups, or less than or equal to about 14 urethane groups.

Generally, the urethane (meth)acrylate may be obtained by reacting a diisocyanate, which is a compound having two isocyanate groups, with a diol, which is a compound having two hydroxy groups, to synthesize a urethane compound; and reacting the urethane compound with a (meth)acrylate having a hydroxy group. According to one embodiment, a urethane compound is synthesized in which at least 3 diisocyanate and at least 2 diols are bound to provide at least 4 urethane groups, and then the urethane compound is reacted with 2 equivalents of a (meth)acrylate compound having a hydroxy group to obtain urethane (meth)acrylate having at least 6 urethane groups and two (meth)acrylate groups.

When diisocyanate is represented by "I," and diol is represented by "O", and (meth)acrylate is represented by "A," the urethane (meth)acrylate according to an embodiment may be represented by A-I-O-I-O-I-A, or A-I-O-I-O-I-O-I-A, or or the like, which may be generalized by the formula A-(I-O)$_n$-I-A (wherein n is greater than or equal to 2, and the connecting mark of "-" refers to a urethane group). The urethane (meth)acrylate such as A-I-O-I-O-I-A having 6 urethane groups includes 3 diisocyanates and 2 diols. The urethane (meth)acrylate such as A-I-O-I-O-I-O-I-A having 8 urethane groups includes 4 diisocyanates and 3 diols. As in above, urethane (meth)acrylate such as A-I-O-I-O-I-O-I-O-I-A having 10 urethane groups includes 5 diisocyanates and 4 diols. Even when the urethane (meth)acrylate is scratched by a pencil having a high level of hardness, it may be self-healed in a short time.

An example of the urethane (meth)acrylate according to an embodiment may be an aliphatic urethane (meth)acrylate. That is, the urethane (meth)acrylate may be derived from an aliphatic diisocyanate, an aliphatic diol, and an aliphatic hydroxy(meth)acrylate. For example, the urethane (meth)acrylate may be derived from a C1 to C20 aliphatic diisocyanate, a C1 to C100 aliphatic diol, and a C1 to C20 hydroxyalkyl(meth)acrylate. The composition including the aliphatic urethane (meth)acrylate and the film prepared therefrom have excellent stability to ultraviolet (UV) light and show excellent transparency and flexibility, thus the urethane (meth)acrylate is suitable for use as a coating film of a foldable device.

The aliphatic diisocyanate is not particularly limited, and may include, for example isophorone diisocyanate, hexamethylene diisocyanate, 4,4-dicyclohexylmethane diisocyanate, hydrogenated xylene diisocyanate, norbornene diisocyanate, lysine diisocyanate, or the like, or a combination thereof.

The hydroxy(meth)acrylate is not particularly limited, and may include, for example, a C1 to C20 hydroxyalkyl(meth)acrylate, a C1 to C15 hydroxyalkyl(meth)acrylate, C2 to C10 hydroxyalkyl(meth)acrylate, or the like, or a combination thereof. In particular, the hydroxy(meth)acrylate may include hydroxyethyl(meth)acrylate, hydroxypropyl(meth)acrylate, hydroxybutyl(meth)acrylate, or a combination thereof. When using hydroxyalkyl(meth)acrylate having a relatively low carbon number, the urethane (meth)acrylate synthesized therefrom may have excellent transparency and flexibility and show a stability to ultraviolet (UV) light.

In the synthesis of urethane (meth)acrylate according to an embodiment, the diol compound may include a long chain diol, a short chain diol, or a combination thereof. For example, the urethane (meth)acrylate may be derived from (a) a diisocyanate, (b1) a long chain diol, (b2) a short chain diol, and (c) hydroxy(meth)acrylate.

The long chain diol may be a C10 to C100 diol, for example a C10 to C100 polyalkylene glycol, a C10 to C100 polylactone glycol, or a combination thereof. Specifically, the long chain diol may include polyethylene glycol, polypropylene glycol, polytetramethylene glycol, polycaprolactone glycol, or the like, or a combination thereof.

The short chain diol may be a C1 to C9 diol, for example a C1 to C9 alkylene glycol, and specifically, ethylene glycol, propylene glycol, butylene glycol, or the like, or a combination thereof.

When the diol compound includes two kinds of the long chain diol and the short chain diol, the urethane (meth)acrylate synthesized therefrom may show excellent flexibility, hardness, and transparency.

Based on the total weight of the diol compound, an amount of the long chain diol may be, for example, about 50 weight percent (wt %) to about 99 wt %, for example, about 55 wt % to about 90 wt %, or about 60 wt % to about 80 wt %. In addition, based on the total weight of the diol compound, an amount of the short chain diol may be, for example, about 1 wt % to about 50 wt %, for example, about 10 wt % to about 45 wt % or about 20 wt % to about 40 wt %. When the amounts of the long chain diol and the short chain diol are within the above ranges, the synthesized urethane (meth)acrylate may show excellent flexibility, hardness, and transparency. In an embodiment, the long chain diol may be a C10 to C100 polyalkylene glycol, a C10 to C100 polylactone glycol, or a combination thereof, and the short chain diol may be a C1 to C9 alkylene glycol.

For example, the urethane (meth)acrylate may be derived from (a) a C1 to C20 aliphatic diisocyanate, (b1) a C10 to C100 polyalkylene glycol or polylactone glycol, (b2) a C1 to C9 alkylene glycol, and (c) a C2 to C10 hydroxyalkyl (meth)acrylate.

The urethane (meth)acrylate according an embodiment may be represented by, for example Chemical Formula 1.

Chemical Formula 1, $R^2$ is a moiety derived from hydroxy (meth)acrylate, and may be an aliphatic group such as an alkylene or a cycloalkylene, and the like. The $R^2$ may be, for example a substituted or unsubstituted C2 to C10 alkylene group, or a substituted or unsubstituted C2 to C6 alkylene group, and in this case, the urethane (meth)acrylate represented by Chemical Formula 1 may exhibit improved transparency and flexibility.

In Chemical Formula 1, $R^3$ is a moiety derived from diisocyanate, and may be an aliphatic group such as an alkylene or a cycloalkylene. The $R^3$ group may be represented by, for example, Chemical Formula 3-1 to Chemical Formula 3-6, or a combination thereof, but is not limited thereto. The urethane (meth)acrylate having the following $R^3$ moiety may exhibit excellent transparency and flexibility.

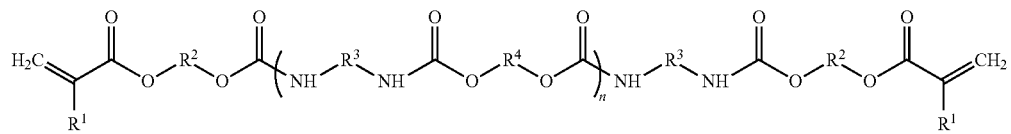

Chemical Formula 1

In Chemical Formula 1, n is a number ranging from 2 to 30, $R^1$ is a hydrogen atom or a methyl group, $R^2$ and $R^3$ are independently a substituted or unsubstituted C1 to C20 alkylene group, or a substituted or unsubstituted C3 to C20 cycloalkylene group, $R^4$ is a substituted or unsubstituted C1 to C10 alkylene, a C2 to C100 divalent functional group including an ether group, an ester group, or a combination of the ether group and the ester group, or a combination thereof.

In order to help better understand Chemical Formula 1, the (meth)acrylate group is outlined by a dotted line in the shape of a quadrangle, and the urethane group is outlined by a dotted line in the shape of a triangle in the following Chemical Formula 2. In Chemical Formula 2, two (meth) acrylate groups are present at the ends of the structure, and n is greater than or equal to 2, so it is confirmed that at least 6 urethane groups are present.

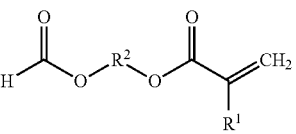

Chemical Formula 3-1

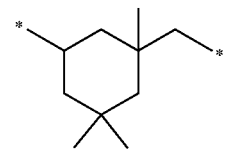

Chemical Formula 3-2

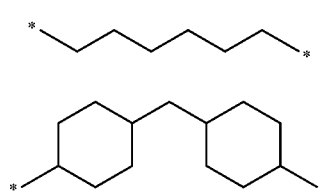

Chemical Formula 3-3

[Chemical Formula 2]

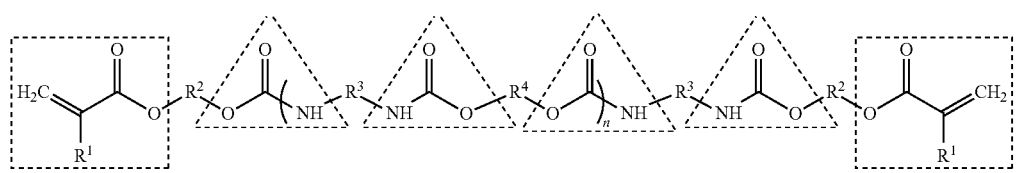

In Chemical Formula 2, the definition of the functional groups are the same as in Chemical Formula 1.

In Chemical Formula 1, n may be, for example, a number of 2 to 20, 2 to 10, 2 to 5, 3 to 10, or 4 to 10. The urethane (meth)acrylate represented by Chemical Formula 1 having n of greater than or equal to about 2 may show excellent self-healing characteristics. On the other hand, a urethane (meth)acrylate having n of 1 rarely shows self-healing characteristics or is only capable of healing a scratch made by a pencil having a relatively low hardness.

Chemical Formula 1 has a structure including a total of two (meth)acrylate groups which are functional groups capable of being cross-linked at both terminal ends. In -continued

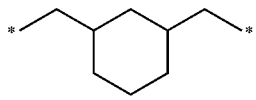

Chemical Formula 3-4

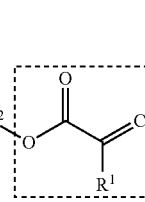

Chemical Formula 3-5

Chemical Formula 3-6

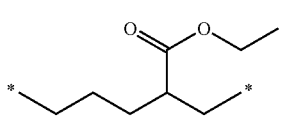

In Chemical Formula 1, $R^4$ is a moiety derived from a diol, and may be a C1 to C100 aliphatic group. In Chemical Formula 1, when $R^4$ is a substituted or unsubstituted C1 to C10 alkylene, the $R^4$ moiety may be derived from a short chain diol or a C1 to C10 alkylene glycol, and for example $R^4$ may be a C1 to C9 alkylene, and specifically ethylene, propylene, butylene, isobutylene, and the like. In Chemical Formula 1, when $R^4$ is a C2 to C100 divalent functional group including an ether group, an ester group, or a combination of an ether group and an ester group, the $R^4$ moiety may be derived from a long chain diol, or polyalkylene glycol and/or polylactone glycol.

In the definition of $R^4$ in Chemical Formula 1, the C2 to C100 divalent functional group including an ether group may refer to a divalent functional group including one or more ether group (—R—O—R'—, wherein R and R' are independently a C1 to C10 alkylene group), and the C2 to C100 divalent functional group including an ester group may refer to a divalent functional group including one or more ester group (—R—C(=O)O—R'—, wherein R and R' are independently a C1 to C10 alkylene group). In Chemical Formula 1, $R^4$ may be, for example a C2 to C100 aliphatic group including an ether group and/or ester group, for example a C2 to C100 alkylene or cycloalkylene including an ether group and/or ester group.

For example, in Chemical Formula 1, the —O—$R^4$—O— moiety may be represented by Chemical Formula 4-1 to Chemical Formula 4-4, or a combination thereof.

Chemical Formula 4-1

\*—O—$R^{11}$—O—\*

Chemical Formula 4-2

\*—O—($R^{12}$—O)$_a$—\*

Chemical Formula 4-3

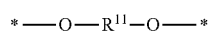

Chemical Formula 4-4

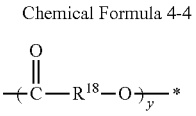

In Chemical Formula 4-1 to Chemical Formula 4-4, $R^{11}$ to $R^{18}$ are each independently a substituted or unsubstituted C1 to C10 alkylene group. In Chemical Formula 4-2 to Chemical Formula 4-4, a, b, x, and y are each independently a number ranging from 2 to 100, for example a number ranging from 2 to 50, a number ranging from 2 to 40, a number ranging from 2 to 30, or a number ranging from 2 to 20.

The moiety represented by Chemical Formula 4-1 may be a moiety derived from a short chain diol, for example alkylene glycol, and the moieties represented by Chemical Formula 4-2 to Chemical Formula 4-4 may be a moiety derived from a long chain diol, for example polyalkylene glycol or polylactone glycol.

The —O—$R^4$—O— moiety of Chemical Formula 1 may be represented by, for example Chemical Formula 4-11 to Chemical Formula 4-17, or a combination thereof.

Chemical Formula 4-11

\*—O—CH$_2$CH$_2$—O—\*

Chemical Formula 4-12

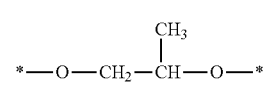

Chemical Formula 4-13

Chemical Formula 4-14

\*—O—(CH$_2$CH$_2$—O)$_{a1}$—\*

Chemical Formula 4-15

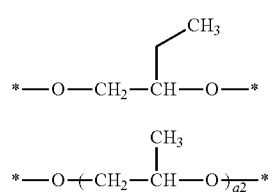

Chemical Formula 4-16

\*—O—(CH$_2$CH$_2$CH$_2$CH$_2$—O)$_{a3}$—\*

Chemical Formula 4-17

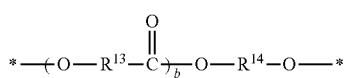

In Chemical Formula 4-14 to Chemical Formula 4-17, a1, a2, a3, x1, and y1 are each independently a number ranging from 2 to 100, for example, a number ranging from 2 to 50, a number ranging from 2 to 40, a number ranging from 2 to 30, or a number ranging from 2 to 20.

In Chemical Formula 1, while a unit represented by n is repeated, the $R^4$ moiety is repeated for greater than or equal to about two times, meaning that greater than or equal to about two $R^4$ groups are present between the terminal ends having the (meth)acrylate groups, wherein the repeated $R^4$ groups may be the same or different from each other.

When synthesizing the urethane (meth)acrylate, as a diol compound, a long chain diol and a short chain diol may be used alone or in a combination thereof. Thus, in the $R^4$ moiety of Chemical Formula 1, only a group derived from the long chain diol may be repeated, or only a group derived from the short chain diol may be repeated, or both the group derived from the long chain diol and the group derived from the short chain diol may exist in the urethane (meth)acrylate. For example, at least one of the $R^4$ groups which repeat between the (meth)acrylate groups at the terminal ends in Chemical Formula 1, is a substituted or unsubstituted C1 to C10 alkylene, while the other $R^4$ group may be a C2 to C100 divalent functional group containing an ether group, an ester group, or a combination of an ether group and an ester group.

For example, when n is 2 in Chemical Formula 1, the urethane (meth)acrylate may be represented by the following Chemical Formula 11; and when n is 3, the urethane (meth)acrylate may be represented by the following Chemical Formula 12. Even when n is greater than or equal to about 4, the urethane (meth)acrylate may be represented in the same manner.

show a stability to ultraviolet (UV) light. The weight average molecular weight may be measured by gel permeation chromatography using a polystyrene standard, for example, a polystyrene-converted average molecular weight standard.

A glass transition (Tg) temperature of the urethane (meth) acrylate may range from about −40° C. to about 40° C., for example about −30° C. to about 30° C., or – about −20° C.

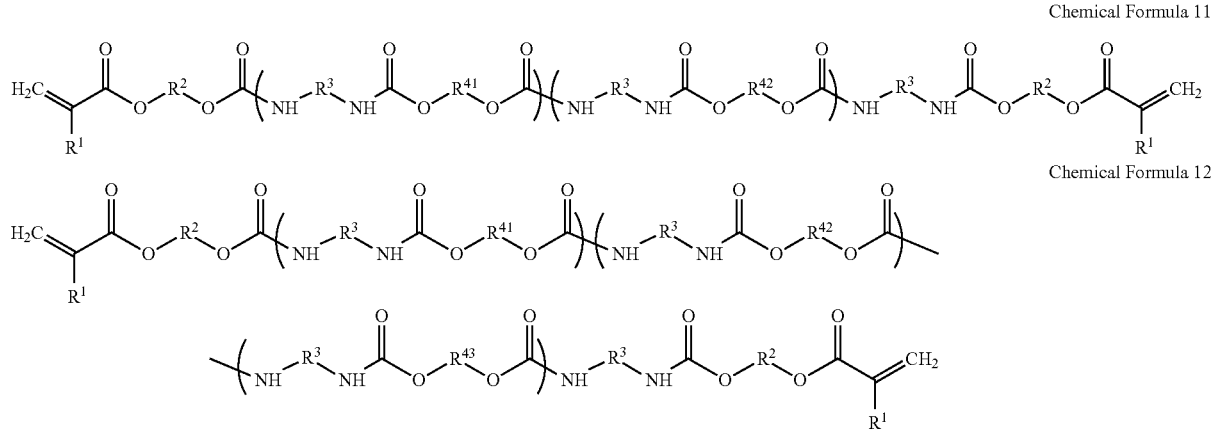

In Chemical Formula 11 and Chemical Formula 12, the definitions for each functional group are same as those used in the definitions of Chemical Formula 1; and $R^{41}$, $R^{42}$ and $R^{43}$ are same or different from each other, and they are the same as the definitions of $R^4$ in Chemical Formula 1.

The urethane (meth)acrylate of Chemical Formula 11 includes six to urethane groups between the terminal ends having the (meth)acrylate groups, and includes three $R^3$ moieties, which are diisocyanate-derived moieties, and two of the $R^{41}$ and $R^{42}$ groups which are dial-derived moieties. In addition, the urethane (meth)acrylate of Chemical Formula 12 includes eight urethane groups between the terminal ends having the chemical crosslinking sites and includes four $R^3$ moieties, which are diisocyanate-derived moieties, and three of $R^{41}$, $R^{42}$, and $R^{43}$ which are diol-derived moieties.

In Chemical Formulae 11 and 12, $R^{42}$ and $R^{43}$ are diol-derived moieties and correspond to $R^4$ of Chemical Formula 1, $R^{41}$, $R^{42}$, and $R^{43}$ may be same or different from each other, and they may be independently a substituted or unsubstituted C1 to C10 alkylene, or a C2 to C100 divalent functional group containing an ether group, an ester group, or a combination of an ether group and an ester group, or a combination thereof. For example, any one of $R^{41}$, $R^{42}$ and $R^{43}$ in Chemical Formula 12 may be a group derived from a short chain diol, and the other two may be groups derived from a long chain diol. Alternatively, any one of $R^{41}$, $R^{42}$, and $R^{43}$ may be a substituted or unsubstituted C1 to C10 alkylene, and the other two may be a C2 to C100 divalent functional group containing an ether group, an ester group, or a combination of an ether group and an ester group.

A weight average molecular weight (Mw) of the urethane (meth)acrylate according to an embodiment may range from about 3,000 grams per mole (g/mol) to about 100,000 g/mol, for example about 3,000 g/mol to about 50,000 g/mol, or about 5,000 g/mol to about 10,000 g/mol. If the urethane (meth)acrylate has a weight average molecular weight satisfying the above range, it may show excellent transparency, flexibility, and self-healing characteristics, and may also to about 20° C. When satisfying the above glass transition temperature range, the urethane (meth)acrylate may show excellent transparency, flexibility, and self-healing characteristics.

In the self-healing composition, an amount of the urethane (meth)acrylate may be about 80 wt % to about 99.9 wt %, for example, about 85 wt % to about 99.9 wt %, or about 90 wt % to about 99.9 wt %, or about 92 wt % to about 99.9 wt %, or about 95 wt % to about 99.9 wt %, based on the total solid content of the self-healing composition.

Polyhedral silsesquioxane according to an embodiment is an organic silicon compound and is also referred to as polyhedral oligomeric silsesquioxane (hereinafter referred to POSS). The type of POSS is not particularly limited, but may include, for example, POSS substituted with an alkyl group, an aryl group, a (meth)acryl group, a vinyl group, an amino group, an alcohol group, a carboxyl group, a halogen group, or a combination thereof.

A POSS substituted with an alkyl group (e.g., an alkyl POSS) may include, for example, octamethyl POSS, octaethyl POSS, octaisobutyl POSS, octaisooctyl POSS, trifloropropyl POSS, or the like. The aryl POSS substituted with an aryl group may include, for example, octaphenyl POSS, dodecaphenyl POSS, trisilanolphenyl POSS, tetrasilanol phenyl POSS, aminopropylphenyl POSS, phenylisobutyl POSS, or the like. The (meth)acryloyl POSS substituted by (meth)acryl group may include, for example, (meth)acryl POSS, (meth)acrylpropyl POSS, (meth)acrylisobutyl POSS, (meth)acrylisooctyl POSS, or the like. In an embodiment, POSS in which a phenyl group is substituted on the polyhedral silsesquioxane may be employed. The POSS substituted with a phenyl group has excellent compatibility with urethane (meth)acrylate.

The self-healing composition according to an embodiment may further include a hardener and a solvent in addition to the urethane (meth)acrylate and the POSS.

In the self-healing composition including the urethane (meth)acrylate, POSS, a hardener, and a solvent, the POSS may be included in an amount of about 0.1 wt % to about 20 wt %, for example, about 0.1 wt % to about 15 wt %, or about 0.1 wt % to about 10 wt %, or about 0.1 wt % to about 8 wt %, or about 0.5 wt % to about 5 wt %, based on the entire solid content of the self-healing composition. When the POSS is included within the above ranges, the composition including the POSS may show excellent self-healing characteristics and transparency.

The hardener may be, for example, a photoinitiator, a free radical photoinitiator, an ionic photoinitiator, or a combination thereof, for example, benzophenone, a ketone-derived initiator, benzoic acid, anthraquinone, acyl phosphine or the like, or a combination thereof, but is not limited thereto. Specific examples of the hardener may be an acetophenone such as diethoxyacetophenone, 2-hydroxy-2-methyl-1-phenylpropan-1-one, benzyldimethyl ketal, 1-hydroxycyclohexyl-phenylketone, 2-methyl-2-morphine (4-thiomethylphenyl)propan-1-one, and the like benzoin ethers such as benzoin methyl ether, benzoin ethyl ether, benzoin isopropyl ether, benzoin isobutyl ether, and the like; benzophenones such as benzophenone, o-benzoylbenzoic acid methyl, 4-phenylbenzophenone, 4-benzoyl-4'-methyldiphenylsulfuric acid, 4-benzoyl-N, N-dimethyl-N-[2-(1-oxo-2-propenyloxy)ethyl]benzene methanaminium bromide, (4-benzoylbenzyl)trimethylammonium chloride, and the like; thioxanthones such as 2,4-diethylthioxanthone, 1,4-dichlorothioxanthone, and the like; 2,4,6-trimethylbenzoyldiphenylbenzoyloxide, and the like, which may be used alone or as a combination thereof.

The hardener may be included in an amount of about 0.01 wt % to about 5 wt %, for example about 0.1 wt % to about 3 wt % based on a total solid content of the composition. When the hardener is included within the above ranges, a cured product having good properties may be obtained.

The solvent present in the self-healing composition is not limited as long as it is capable of dissolving or dispersing the aforementioned components. The solvent may include, for example, an aliphatic hydrocarbon solvent such as hexane, heptane, methylene chloride, and the like; an aromatic hydrocarbon solvent such as benzene, toluene, pyridine, quinoline, anisole, mesitylene (mesitylene), xylene, and the like; a ketone based solvent such as methyl isobutyl ketone, 1-methyl-2-pyrrolidinone (NMP), cyclohexanone, acetone and the like; an ether based solvent such as tetrahydrofuran (THF), isopropyl ether, and the like; an acetate based solvent such as ethyl acetate, butyl acetate, propylene glycol methyl ether acetate, and the like; an alcohol based solvent such as isopropyl alcohol, butanol, and the like; an amide based solvent such as dimethylacetamide, dimethyl formamide (DMF), and the like; a nitrile-based solvent such as acetonitrile, benzonitrile, and the like; and a combination comprising at least two of the foregoing solvents, but is not limited thereto.

The self-healing composition according to an embodiment may be coated on a substrate or a device or the like and cured to provide a self-healing film. The self-healing film may be a coating film or a coating layer, for example, a coating film used to protect a display device which is a display module, or a window of the display device. The self-healing film including a cured product of the self-healing composition is colorless, transparent, and has self-healing characteristics, i.e., the self-healing film may be self-healed within a short time at room temperature after being scratched. The self-healing film also has a high degree of transparency, a high hardness, and excellent flexibility, so as to be suitably applied as a coating layer for a foldable, bendable, or rollable display, and the like.

Figure 3:
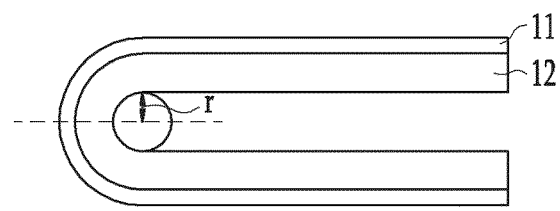
FIG. 3 is a schematic view showing a folded shape of a self-healing film according to an embodiment.
Figure 4:
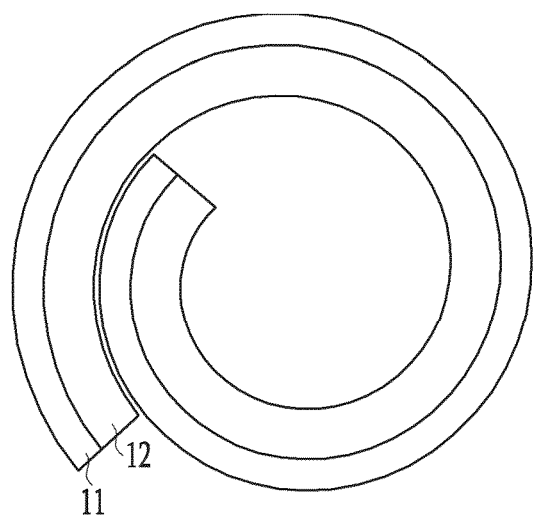
FIG. 4 is a schematic view showing a rolled shape of a self-healing film according to an embodiment.

FIGS. 3 and 4 are schematic views showing folding and rolling shapes, respectively, of a self-healing film according to an embodiment. In FIGS. 3 and 4, a reference numeral 11 indicates the self-healing film obtained by curing the is self-healing composition according to an embodiment, and a reference numeral 12 may be a substrate or a device. In FIG. 3, r indicates a curvature radius.

The self-healing film according to an embodiment may have excellent self-healing characteristics. For example, a surface of the self-healing film is scratched by moving a pencil having a defined, predetermined hardness under a known pressure and at a defined angle over the surface of the film. For example, a scratch may be formed in the surface of the film by moving a pencil having a predetermined hardness at a load of about 1 kilogram force (kgf), and then observing the film for a period of about 20 minutes to determine whether the self-healing film has recovered from the scratch. The highest pencil hardness may be greater than or equal to about H, for example, about 2H, about 3H or about 4H. In order words, the self-healing film may be self-healed within about 20 minutes even after being scratched by a pencil having a hardness of greater than or equal to about H. In this case, the self-healing film may have a thickness within a range from about 10 micrometer (pm) to about 200 μm, or about 10 μm to about 100 μm, or about 10 μm to about 75 μm.

In addition, the self-healing film may be scratched on the surface thereof by applying a load of about 1 kgf using a pencil having a hardness of greater than or equal to 4H, and then allowed to self-heal for about 24 hours, in which case the film may be healed. That is, the self-healing film may be self-healed within about 24 hours after being scratched by a pencil having a hardness of greater than or equal to about 4H. Put another way, the self-healing film may have a highest pencil hardness of greater than or equal to about 4H.

In addition, when the self-healing film is scratched by applying a pencil having a hardness of about 4H and a load of about 1 kgf, the self-healing film may be self-healed within less than or equal to about 70 minutes, for example, less than or equal to about 60 minutes, or less than or equal to about 30 minutes, or less than or equal to about 20 minutes.

As the thickness of the self-healing film has is increased, the self-healing film may be self-healed within a shorter period of time. For example, when the self-healing film has a thickness of about 10 μm to about 100 μm, and is scratched by applying a pencil having a hardness of about 4H and a load of about 1 kgf, the self-healing film may be self-healed within less than or equal to about 60 minutes; when the self-healing film has a thickness of about 100 μm to about 1,000 μm, the self-healing film may be self-healed within less than or equal to about 10 minutes.

The self-healing film according to an embodiment, is colorless, transparent, and has a high light transmittance. For example, the self-healing film may have a light transmittance of greater than or equal to about 85%, greater than or equal to about 90%, or greater than or equal to about 91.5%. In addition, when the self-healing film is exposed to ultraviolet (UV) light for 72 hours and then measured for a yellowness index, the results thereof may be less than or equal to about 1. For example, the self-healing film has a yellowness index of less than or equal to about 1, for example, less than or equal to about 0.5, or less than or equal to about 0.2. In addition, the film may have a haze of less than or equal to about 1%.

An embodiment provides a device including the self-healing film. The device may include an exterior material requiring self-healing characteristics. For example, the device may be an electronic device such as a smart phone, a tablet PC, a camera, a touch screen panel, and the like, or a home appliance, an interior or exterior material for a vehicle, an electronic member, a various kinds of plastic molded articles, and the like. In addition, the device may be a flexible device such as a foldable, bendable or rollable device, and examples thereof may be a foldable display or a foldable smart phone.

The self-healing film may be applied on, for example, a display panel attached with a window. A solution of a self-healing composition is coated on the window surface of the display panel and cured to provide a film, or the self-healing film may be attached on the window surface of the display panel. In this case, an adhesive layer or a transparent substrate layer may be disposed between the self-healing film and the window, or other protective layer or a coating layer may be disposed on the exterior surface of the self-healing film.

The self-healing film may effectively protect the device from physical and/or chemical damage, and may be self-healed after being scratched, so it may effectively protect the device for a long time. In addition since the self-healing film is colorless and transparent, it does not influence the appearance of the device. In addition, the self-healing film is flexible enough to firmly protect the device even if the device including the self-healing film is repeatedly folded and unfolded for several ten thousands of times.

Figure 5:
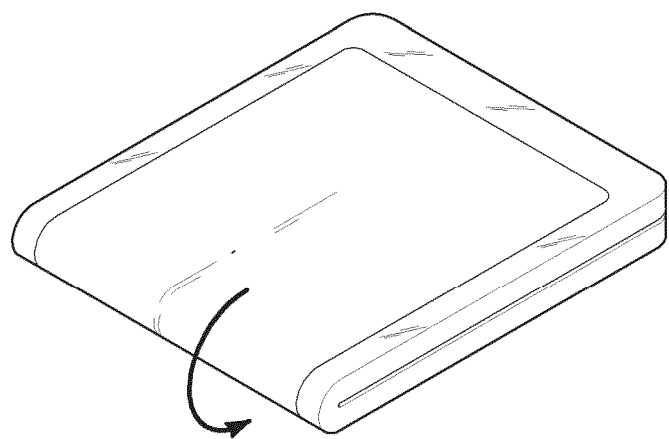
FIG. 5 is a schematic perspective view showing a shape of a foldable display according to an embodiment.

FIG. 5 is a schematic view showing a shape of a foldable display that has been folded, according to an embodiment. The foldable display shown in FIG. 5 may be an outward-folding display in which a display module is folded toward the outside. The self-healing film according to an embodiment may be disposed on the surface on the outside of the display module of the foldable display.

Hereinafter, the present disclosure is illustrated in more detail with reference to examples. However, these examples are exemplary, and the present disclosure is not limited thereto.

EXAMPLES

Synthesis Example: Synthesis of Urethane (meth)acrylate

Synthesis Example 1

Under a nitrogen atmosphere, 81 grams (g) of polycaprolactone diol (0.154 mole, Daicel PCL 205U), 5.948 g (0.066 mole) of butanediol, 65.365 g (0.2941 mole) of isophorone diisocyanate, and 73.5 g of ethylacetate are introduced into a 3-neck flask and mixed and then heated up to 70° C. At a state of constantly maintaining a temperature, the reaction occurs for 3 hours with stirring. The temperature is cooled to 60° C., and the reaction mixture is combined with 19.183 g (0.1474 mole) of hydroxypropyl acrylate and then additionally reacted for 2 hours with stirring, and the solution is cooled to provide a urethane acrylate oligomer. The obtained urethane acrylate shows a peak at 2270 cm$^{-1}$ by infrared ray spectroscopy, which is corresponds to an isocyanate group, and has a weight average molecular weight of about 6,500 g/mol and a glass transition temperature of about 10° C. The obtained urethane acrylate has a structure including eight urethane groups between the terminal acrylate groups, and has a mole ratio of diisocyanate:diol:acrylate of 4:3:2. Additional information regarding the structure of the obtained urethane acrylate is shown in the following Table 1.

Synthesis Example 2

Urethane acrylate is synthesized in accordance with the same procedure as in Synthesis Example 1, except that polypropylene glycol is used instead of polycaprolactone diol. The obtained urethane acrylate has a weight average molecular weight of about 6,200 g/mol and a glass transition temperature of about −5° C. The synthesized urethane acrylate has a structure including eight urethane groups between the terminal acrylate groups and may be represented by, for example, the following Chemical Formula 13:

Chemical Formula 13

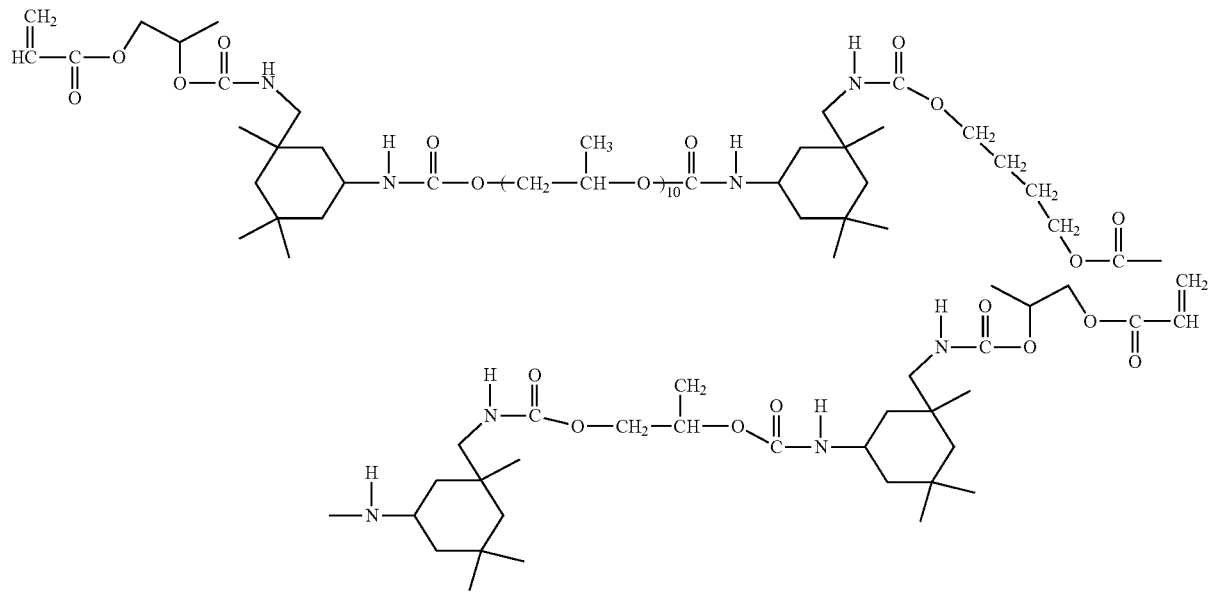

Synthesis Example 3

Urethane acrylate is synthesized in accordance with the same procedure as described in Synthesis Example 2, except that the mole ratio of diisocyanate:diol:acrylate is adjusted to 3:2:2. The obtained urethane acrylate has a weight average molecular weight of about 4,600 g/mol and a glass transition temperature of about 17° C. The obtained urethane acrylate includes six urethane groups between the terminal acrylate groups and may be represented by the following Chemical Formula 14:

Chemical Formula 14

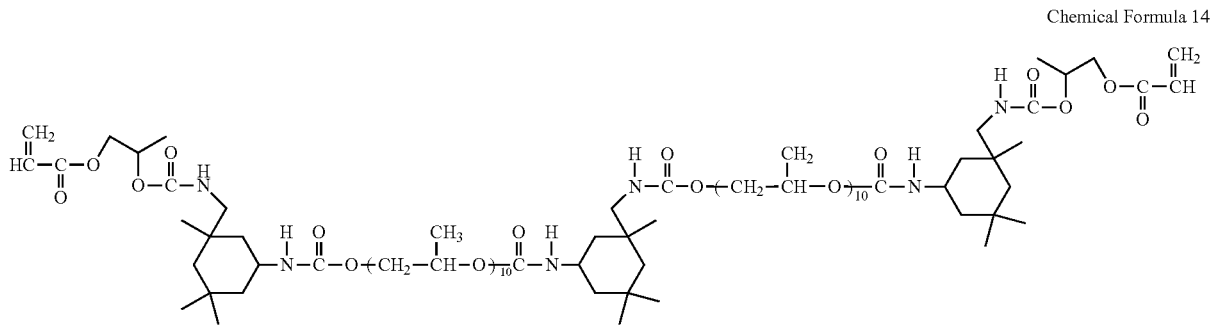

Synthesis Example 4

Urethane acrylate is synthesized in accordance with the same procedure as described in Synthesis Example 2, except that the mole ratio of diisocyanate:diol:acrylate is adjusted to 5:4:2. The obtained urethane acrylate has a weight average molecular weight of about 5,500 g/mol and a glass transition temperature of about 13° C. The obtained urethane acrylate includes ten urethane groups between the terminal acrylate groups and may be represented by the following Chemical Formula 15:

Chemical Formula 15

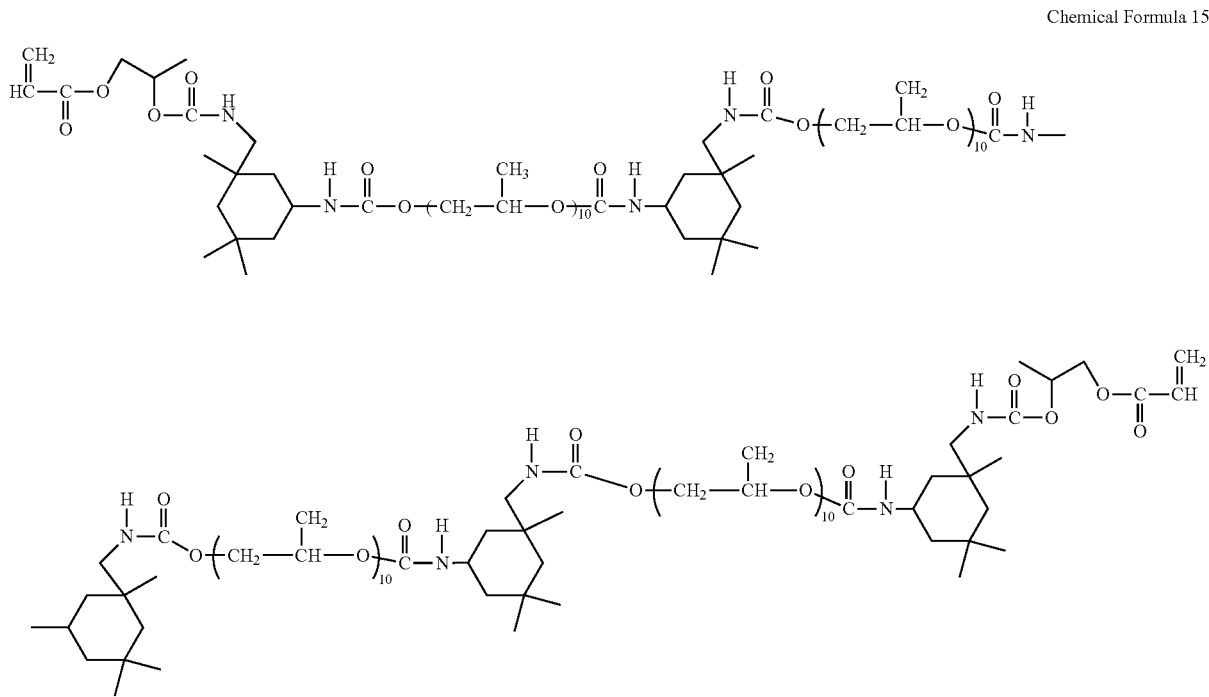

Comparative Synthesis Example 1

A urethane acrylate is synthesized in accordance with the same procedure as described in Synthesis Example 2, except that the mole ratio of diisocyanate:diol:acrylate is adjusted to 2:1:2. The obtained urethane acrylate includes four urethane groups between the both terminal ends of acrylate groups and may be represented by the following Chemical Formula 16:

Chemical Formula 16

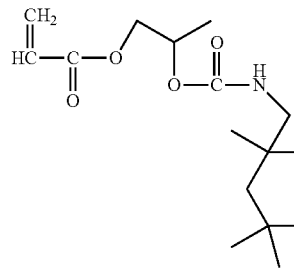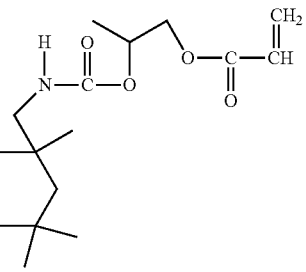

Comparative Synthesis Example 2

Dipentaerythritol hexaacrylate (Aldrich) including six acrylate groups is prepared, instead of the urethane (meth) acrylate according to an embodiment.

A summary of the information for the structures of compounds obtained from Synthesis Examples 1 to 4 and Comparative Synthesis Examples 1 and 2 are shown in the following Table 1. In Table 1, the number of diisocyanate groups, the number of diol groups, and the number of urethane groups mean the numbers of each of them which are present between the chemical crosslinking sites of the terminal acrylate groups.

TABLE 1

| | The number of diisocyanate | The number of diol | The number of urethane group | The number of acrylate group |
|---|---|---|---|---|
| Synthesis Example 1 | 4 | 3 | 8 | 2 |
| Synthesis Example 2 | 4 | 3 | 8 | 2 |
| Synthesis Example 3 | 3 | 2 | 6 | 2 |
| Synthesis Example 4 | 5 | 4 | 10 | 2 |
| Comparative Synthesis Example 1 | 2 | 1 | 4 | 2 |
| Comparative Synthesis Example 2 | 0 | 0 | 0 | 6 |

Examples and Comparative Examples: Composition with Self-healing Property and Film with Self-healing Property

Comparative Example 1

A photoinitiator (Irgacure 184) is added in an amount of 0.5 wt % based on the solid entire weight of the urethane acrylate obtained from Synthesis Example 1 to prepare a self-healing composition. The self-healing composition according to Comparative Example 1 does not include POSS. The solution including the self-healing composition is coated on a PET film having a thickness of 100 μm and dried at 120° C. for 5 minutes. Then it is cured in at an ultraviolet (UV) intensity of 800 milliwatts per square centimeter (mW/cm$^2$) and an ultraviolet (UV) dose of 3 joules per square centimeter (J/cm$^2$) to provide a coating film having a thickness of 50 μm to 60 μm, so a self-healing film is obtained.

Comparative Example 2

A self-healing composition and a self-healing film are obtained in accordance with the same procedure as in Comparative Example 1, except that 1 wt % of silica (Aerosil 8972) is added to the self-healing composition according to Comparative Example 1.

Example 1-1 to Example 1-8

A self-healing composition and a self-healing film are obtained in accordance with the same procedure as in Comparative Example 1, except that trisilanol phenyl POSS (Hybrid Plastic) is added to the self-healing composition according to Comparative Example 1 in an amount shown in the following Table 2.

Example 2-1 to Example 2-6

A composition and a film are obtained in accordance with the same procedure as in Comparative Example 1, except that acryl PASS (Hybrid Plastic) is added to the composition according to Comparative Example 1 in an amount shown in the following Table 2.

Example 3-1 to Example 3-3

A self-healing composition and a film are obtained in accordance with the same procedure as in Comparative Example 1, except that trisilanol phenyl POSS and octaacrylpropyl POSS are added to the self-healing composition according to Comparative Example 1 in an amount shown in the following Table 2.

Comparative Example 3

A self-healing composition and a self-healing film are obtained in accordance with the same procedure as in Example 1-2, except that 6-functional acrylate compound obtained from Comparative Synthesis Example 2 is used instead of the urethane acrylate obtained from Synthesis Example 1.

Comparative Example 4

A photoinitiator (Irgacure 184) is added in an amount of 0.5 wt % based on the solid entire weight to the urethane acrylate obtained from Comparative Synthesis Example 1 and added with 1 wt % of trisilanol phenyl POSS to provide a self-healing composition, and it is coated on a PET film having a thickness of 100 μm and dried and cured by irradiating ultraviolet (UV) at 300 mW/cm² for 2 minutes to provide a self-healing film.

Example 4

A self-healing composition and a self-healing film are obtained in accordance with the same procedure as in Comparative Example 4, except that urethane acrylate obtained from Synthesis Example 2 is used instead of the urethane acrylate obtained from Comparative Synthesis Example 1.

Example 5

A self-healing composition and a self-healing film are obtained in accordance with the same procedure as in Comparative Example 4, except that urethane acrylate obtained from Synthesis Example 3 is used instead of the urethane acrylate obtained from Comparative Synthesis Example 1.

Example 6

A self-healing composition and a self-healing film are obtained in accordance with the same procedure as in Comparative Example 4, except that urethane acrylate obtained from Synthesis Example 4 is used instead of the urethane acrylate obtained from Comparative Synthesis Example 1.

Evaluation Example 1

Evaluation of Self-Healing Characteristics

Figure 1B:
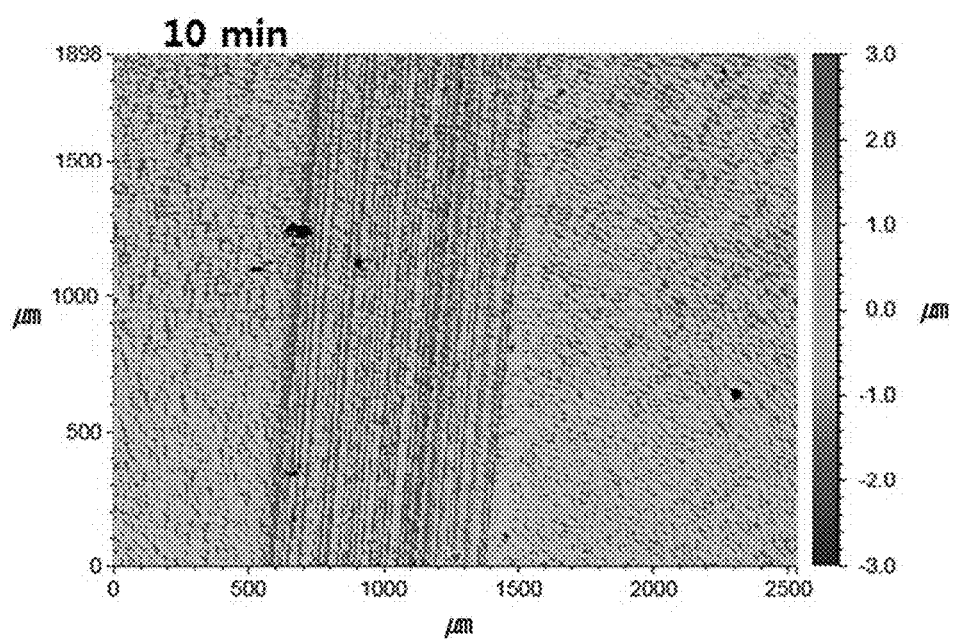
FIGS. 1B to 1D are photographs of the surface of the self-healing film in accordance with Example 1-2, as viewed by a 3D microscope after a time of 10 minutes, 20 minutes, and 70 minutes after being scratched, respectively.
Figure 1C:
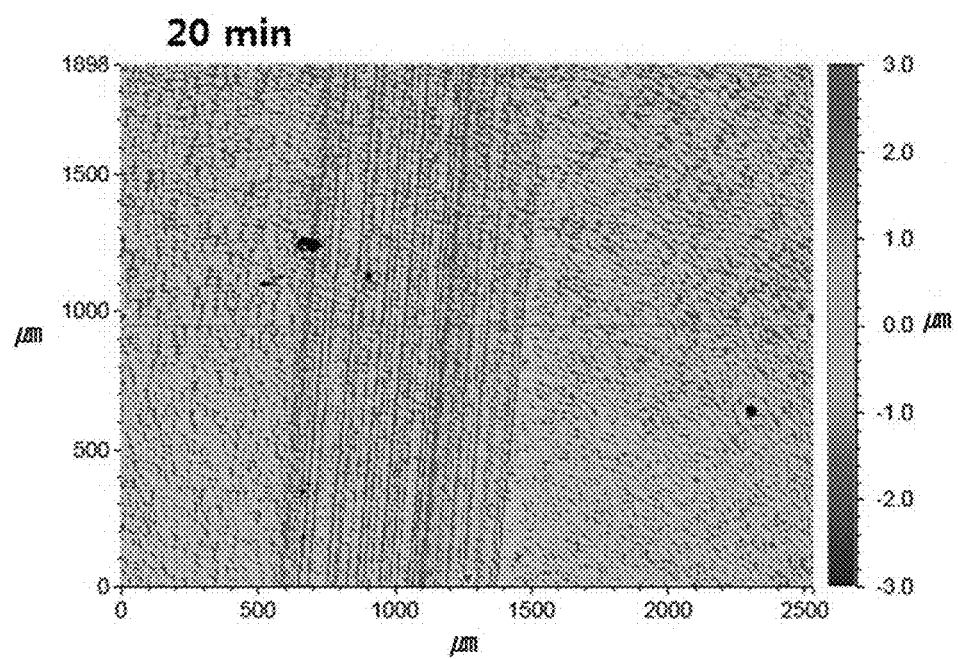
Figure 1D:
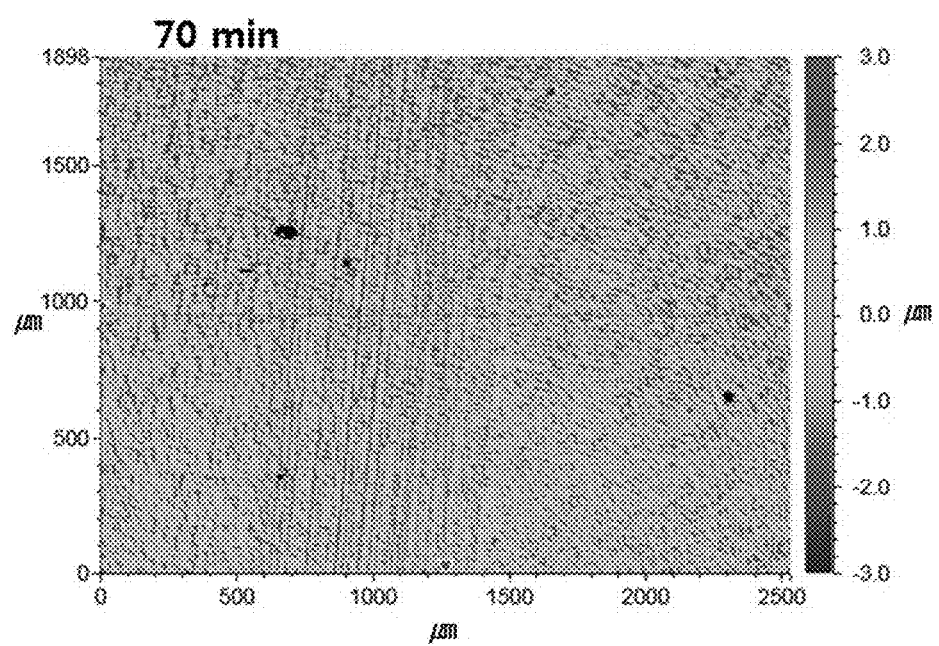

FIGS. 1A to 1D are photographs observing the surface of the self-healing film obtained from Example 1-2 as viewed using a 3D microscope. FIG. 1A is a photograph taken right after the surface of the self-healing film has been scratched with a 1 kgf load using a pencil having a hardness of 4H. FIGS. 1B-1D are photographs taken after 10 minutes, after 20 minutes, and after 70 minutes, respectively. In FIGS. 1A to 1D, a scale is provided to the right of the photograph providing a way to quantitatively assess the effect of the scratch on the surface of the film. The lower end of the scale refers to the depth of grooves which are formed by the scratch relative to the surface of the film, while the upper end of the scale refers the height of protrusions which are formed by the scratch relative to the surface of the film. For example, the darkest blue portion indicates a groove in which extends to a depth of about 3.0 μm below the film surface, and the darkest red portion indicates a protrusion which extends to a height of about 3.0 μm above the film surface. It is confirmed that the self-healing film surface is scratched along with blue and red lines in FIG. 1A. Referring to FIG. 1C, the scratches are almost recovered after about 20 minutes, and as shown in FIG. 1D, it is confirmed that the scratches are completely recovered after about 70 minutes.

Figure 2:
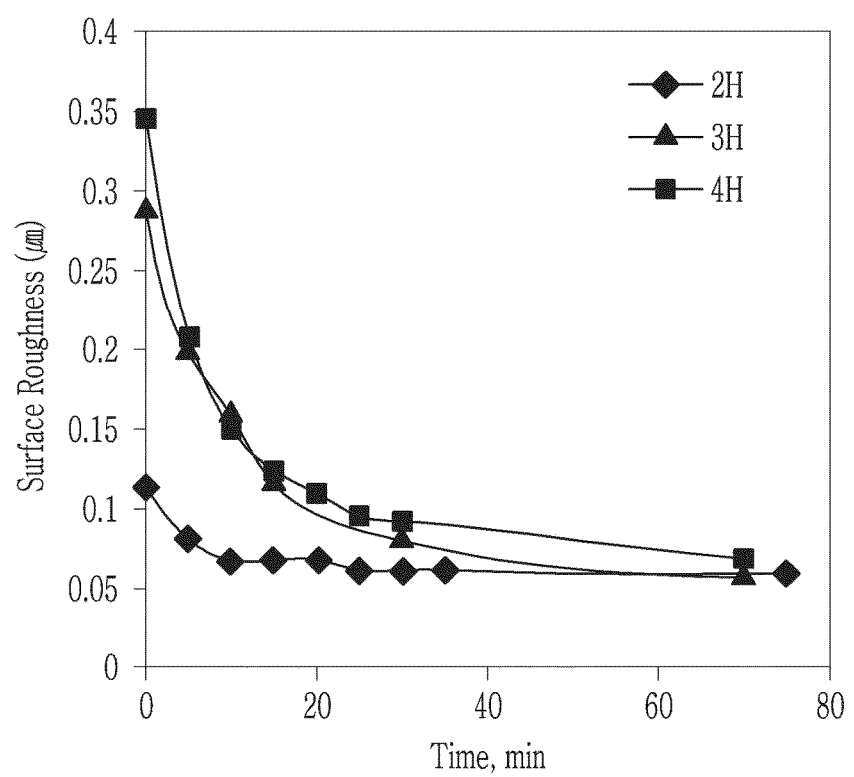
FIG. 2 is a graph of the surface roughness (micrometers, μm) versus time (minutes, min) showing a surface roughness ($R_a$) change after scratching a film with a self-healing property obtained from Example 1-2 with a pencil strength of 2H, 3H, and 4H.

FIG. 2 is a graph showing the change in surface roughness ($R_a$) of the self-healing film obtained from Example 1-2 according to a lapse of time after being scratched by a pencil having a hardness of about 2H, 3H, and 4H. Referring to FIG. 2, it is understood that the scratches according to each strength are almost healed after about 20 minutes and seem to be completely healed after about 30 minutes.

Evaluation Example 2

Comparison of Self-Healing Characteristics and Transparency According to Presence and Contents of POSS (1) Evaluation of Self-Healing Characteristics Self-healing films obtained from Comparative Examples 1 and 2, Examples 1-1 to 1-8, Examples 2-1 to 2-6, and Examples 3-1 to 3-3, are scratched with a 1 kgf load with pencils having a variety hardnesses, and then observed for self-healing after 20 minutes, and the maximum pencil hardness among the pencil hardnesses, for which the self-healing films are capable of self-healing within 20 minutes, is shown in the following Table 2.

(2) Evaluation of Light Transmittance and Yellowness Index

For the self-healing films obtained from Comparative Examples 1 to 2, Examples 1-1 to 1-8, Examples 2-1 to 2-6, and Examples 3-1 to 3-3, a light transmittance and a yellowness index are measured according to ASTM E313 Standard using a UV spectrophotometer (KONICA MINOLTA, cm-3600d), and the results are shown in the following Table 2.

TABLE 2

| | Kinds of additives | Amount of additives (wt %) | Self-healing pencil hardness @20 min. | Light transmittance (%) | Yellowness index |
|---|---|---|---|---|---|
| Comparative Example 1 | — | — | 2B | 91.5-92.1 | 0.0-0.2 |
| Comparative Example 2 | silica | 1 | 2B | | |
| Example 1-1 | pbenylPOSS | 0.5 | 3H | | |
| Example 1-2 | pbenylPOSS | 1 | 3H | | |
| Example 1-3 | pbenylPOSS | 2 | 3H | | |
| Example 1-4 | pbenylPOSS | 3 | 2H | | |
| Example 1-5 | pbenylPOSS | 4 | 2H | | |
| Example 1-6 | pbenylPOSS | 5 | 2H | | |
| Example 1-7 | pbenylPOSS | 10 | H | | |
| Example 1-8 | pbenylPOSS | 20 | H | | |
| Example 2-1 | acrylPOSS | 0.5 | 3H | 91.5-92.1 | 0.0-0.2 |
| Example 2-2 | acrylPOSS | 1 | 3H | | |
| Example 2-3 | acrylPOSS | 2 | 3H | | |
| Example 2-4 | acrylPOSS | 3 | 2H | | |
| Example 2-5 | acrylPOSS | 4 | 2H | | |
| Example 2-6 | acrylPOSS | 5 | H | | |
| Example 3-1 | phenylPOSS/acrylPOSS | 0.7/0.3 | 3H | 91.5-92.1 | 0.0-0.2 |
| Example 3-2 | phenylPOSS/acrylPOSS | 0.5/0.5 | 2H | | |
| Example 3-3 | phenylPOSS/acrylPOSS | 0.3/0.7 | 2H | | |

Referring to Table 2, it is confirmed that the film obtained from the Examples show excellent self-healing characteristics even for the high strength scratch, compared to the Comparative Examples. The Examples also show excellent transparency and low yellowness index.

Evaluation Example 3

Comparison of Folding Test Results According to Number of Functional Groups of the Urethane (meth)acrylate Each self-healing composition obtained from Example 1-2 and Comparative Example 3 is coated on a corona-treated PET film having a thickness of 50 µm and dried at a room temperature for 10 minutes and 90° C. for 10 minutes to provide a self-healing film having a thickness of 150 µm. A 50 µm PET film is disposed thereon and attached by a roller and cured by irradiating ultraviolet (UV) light (UV dose: 3,000 mJ/cm², UV intensity: 800 mW/cm²) and aging at a room temperature for 12 hours, and cut into a size of 100×100 mm.

A folding (bending) test for a self-healing film is performed by mounting the cut specimen in a flexible bending tester (Covotech, CFT-200) using an adhesive (Tesa, 4965) and repeatedly bending the self-healing film at room temperature (e.g., about 20° C.), at a curvature radius of 1 mm, and at a rate of 30 times per minute in an outer bending mode, and counting the number of times the film is bent without damaging the appearance (e.g., formation of a crack in the film), and the results are shown in the following Table 3.

TABLE 3

| | Kinds of compounds | The number of acrylate groups in the compound | Amount of POSS (wt %) | Bending number |
|---|---|---|---|---|
| Example 1-2 | Synthesis Example 1 | 2 | 1 | 200,000 |
| Comparative Example 3 | Comparative Synthesis Example 2 | 6 | 1 | <1,000 |

Referring to Table 3, it is confirmed that the self-healing film according to Example 1-2 shows excellent results since the appearance of the film is not damaged before the folding test is repeated about 200,000 times, thus it is confirmed that the film has very high flexibility enough to show foldable, bendable, or rollable characteristics. On the other hand, the film according to Comparative Example 3 prepared from the compound having the number of functional groups of greater than 2 has unfavorable flexibility since the appearance is damaged in repeating the folding test for less than 1,000 times, thus it is understood that it is difficult to be applied for a flexible device.

Evaluation Example 4

Comparison of Self-healing Characteristics According to Number of Urethane Groups in the Urethane (meth)acrylate For the self-healing films obtained from Comparative Example 4 and Examples 4 to 6, a maximum pencil hardness at which a scratch with a 500 gram force (gf) load is self-healed after 15 minutes is determined, and the results are shown in the following Table 4.

TABLE 4

| | Kinds of urethane acrylate | The number of urethane groups | Self-healing pencil hardness |
|---|---|---|---|
| Comparative Example 4 | Comparative Synthesis Example 1 | 4 | 1H |
| Example 4 | Synthesis Example 2 | 8 | 3H |
| Example 5 | Synthesis Example 3 | 6 | 3H |
| Example 6 | Synthesis Example 4 | 10 | 3H |

Referring to Table 4, it is confirmed that in a case of Comparative Example 4 including a urethane (meth)acrylate having 4 urethane groups, the maximum pencil hardness at which a scratch with a 500 gf load is self-healed after 15 minutes is only H, but in cases of Examples 4 to 6 including a urethane (meth)acrylate having at least 6 urethane groups, the maximum pencil hardness which is self-healed is improved up to 3H.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A composition comprising,
   about 80 weight percent to about 99.9 weight percent of a urethane (meth)acrylate having two (meth)acrylate groups, and six or more urethane groups, based on a total solid content of the composition, and
   a polyhedral silsesquioxane (POSS),
   wherein the POSS is substituted with an alkyl group, an aryl group, a (meth)acryl group, an amino group, an alcohol group, a carboxyl group, a halogen group, or a combination thereof.

2. The composition of claim 1, wherein the POSS is substituted with an alkyl group and comprises octamethyl POSS, octaethyl POSS, octaisobutyl POSS, octaisooctyl POSS, trifluoropropyl POSS, or a combination thereof.

3. The composition of claim 1, wherein the POSS is substituted with an aryl group and comprises octaphenyl POSS, dodecaphenyl POSS, trisilanolphenyl POSS, tetrasilanol phenyl POSS, aminopropylphenyl POSS, phenylisobutyl POSS, or a combination thereof.

4. The composition of claim 1, wherein the POSS is substituted with a (meth)acryl group and comprises (meth)acryl POSS, (meth)acrylpropyl POSS, (meth)acrylisobutyl POSS, (meth)acrylisooctyl POSS, or a combination thereof.

5. The composition of claim 1, wherein the urethane (meth)acrylate is a reaction product of a C1 to C20 aliphatic diisocyanate, a C1 to C100 aliphatic diol, and a C1 to C20 hydroxyalkyl(meth)acrylate.

6. The composition of claim 5, wherein the C1 to C100 aliphatic diol comprises
   about 50 weight percent to about 99 weight percent of a C10 to C100 polyalkylene glycol or a polylactone glycol, and
   about 1 weight percent to about 50 weight percent of C1 to C9 alkylene glycol, based on a total weight of the C1-C100 aliphatic diol in the urethane (meth)acrylate.

7. The composition of claim 1, wherein the urethane (meth)acrylate is represented by Chemical Formula 1:

Chemical Formula 1

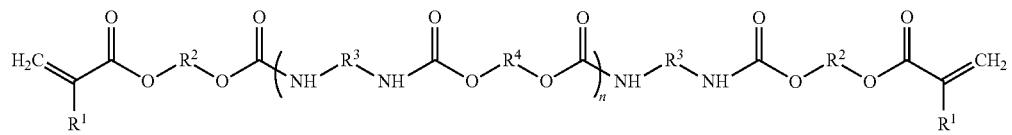

wherein, in Chemical Formula 1,
n is a number ranging from 2 to 30,
$R^1$ is a hydrogen atom or a methyl group,
$R^2$ and $R^3$ are each independently a substituted or unsubstituted C1 to C20 alkylene group, or a substituted or unsubstituted C3 to C20 cycloalkylene group, and
$R^4$ is a substituted or unsubstituted C1 to C10 alkylene, a C2 to C100 divalent functional group including an ether group, an ester group, or a combination of the ether group and the ester group, or a combination thereof.

8. The composition of claim 7, wherein the —O—$R^4$—O— moiety of Chemical Formula 1 is represented by Chemical Formula 4-1 to Chemical Formula 4-4, or a combination thereof:

*—O—$R^{11}$—O—*  
Chemical Formula 4-1

*—O—($R^{12}$—O)$_a$—*  
Chemical Formula 4-2

-continued

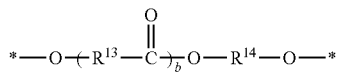
Chemical Formula 4-3

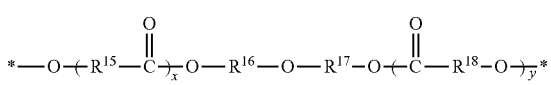
Chemical Formula 4-4 wherein, in Chemical Formula 4-1 to Chemical Formula 4-4, $R^{11}$ to $R^{18}$ are each independently a substituted or unsubstituted C1 to C10 alkylene group, and wherein, in Chemical Formula 4-2 to Chemical Formula 4-4, a, b, x, and y are each independently a number ranging from 2 to 100.

9. The composition of claim 8, wherein the —O—$R^4$—O— moiety of Chemical Formula 1 is represented by Chemical Formula 4-11 to Chemical Formula 4-17, or a combination thereof:

*—O—CH$_2$CH$_2$—O—*  
Chemical Formula 4-11

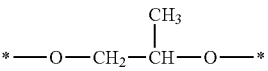
Chemical Formula 4-12

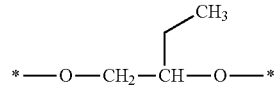
Chemical Formula 4-13

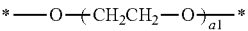
Chemical Formula 4-14

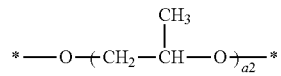
Chemical Formula 4-15

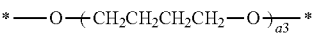
Chemical Formula 4-16

Chemical Formula 4-17 wherein, in Chemical Formula 4-14 to Chemical Formula 4-17, a1, a2, a3, x1, and y1 are each independently a number ranging from 2 to 100.

10. The composition of claim 7, wherein $R^3$ of Chemical Formula 1 is represented by Chemical Formula 3-1 to Chemical Formula 3-6, or a combination thereof:

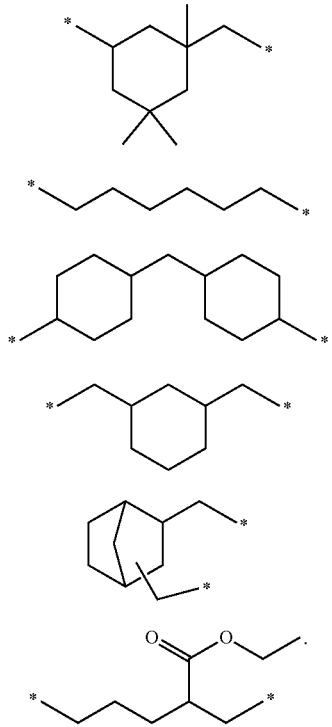

Chemical Formula 3-1

Chemical Formula 3-2

Chemical Formula 3-3

Chemical Formula 3-4

Chemical Formula 3-5

Chemical Formula 3-6

11. The composition of claim 7, wherein $R^2$ of Chemical Formula 1 is a substituted or unsubstituted C2 to C6 alkylene group.

12. The composition of claim 1, wherein a weight average molecular weight of the urethane (meth)acrylate ranges from about 3,000 grams per mole to about 100,000 grams per mole.

13. The composition of claim 1, wherein a glass transition temperature of the urethane (meth)acrylate ranges from about −40° C. to about 40° C.

14. The composition of claim 1, wherein the composition further includes a hardener, a solvent, or a combination thereof.

15. The composition of claim 14, wherein the hardener is present in an amount of about 0.01 wt % to about 5 weight percent based on a total solid content of the composition.

16. The composition of claim 1, wherein the POSS is present in an amount of about 0.1 weight percent to about 20 weight percent based on a total solid content of the composition.

17. The composition of claim 1, wherein the urethane (meth)acrylate having two (meth)acrylate groups and six or more urethane groups is present in an amount of about 92 weight percent to about 99.9 weight percent based on a total solid content of the composition, and the POSS is present in an amount of about 0.1 weight percent to about 8 weight percent based on a total solid content of the composition.

18. A film comprising, a cured product of a composition, the composition comprising:
about 80 weight percent to about 99.9 weight percent of a urethane (meth)acrylate having two (meth)acrylate groups and six or more urethane groups, based on a total solid content of the composition, and
a polyhedral silsesquioxane (POSS),
wherein the POSS is substituted with an alkyl group, an aryl group, a (meth)acryl group, an amino group, an alcohol group, a carboxyl group, a halogen group, or a combination thereof.

19. The film of claim 18, wherein a scratch in the film formed by a pencil having a hardness of 4H at a load of 1 kilogram-force is self-healed in 20 minutes.

20. The film of claim 18, wherein light transmittance of the film is greater than or equal to about 90% and a yellowness index of the film is less than or equal to about 1.

21. A device comprising the film of claim 18.

22. The device of claim 21, wherein the device is a display module, a smart phone, a tablet PC, a camera, a touch screen panel, a home appliance, an interior or exterior material for a vehicle, an electronic member, or a plastic molded article.

* * * * *